(12) United States Patent
Garner

(10) Patent No.: US 11,059,270 B2
(45) Date of Patent: Jul. 13, 2021

(54) METHODS OF FORMING SHAPE-RETAINING FLEXIBLE GLASS-POLYMER LAMINATES

(71) Applicant: Corning Incorporated, Corning, NY (US)

(72) Inventor: Sean Matthew Garner, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 157 days.

(21) Appl. No.: 16/051,938

(22) Filed: Aug. 1, 2018

(65) Prior Publication Data
US 2018/0339505 A1    Nov. 29, 2018

Related U.S. Application Data

(63) Continuation of application No. 14/769,964, filed as application No. PCT/US2014/017884 on Feb. 24, 2014, now Pat. No. 10,065,406.

(Continued)

(51) Int. Cl.
*B32B 17/10* (2006.01)
*B32B 17/06* (2006.01)
(Continued)

(52) U.S. Cl.
CPC .......... *B32B 17/10* (2013.01); *B29C 53/005* (2013.01); *B32B 1/00* (2013.01); *B32B 17/064* (2013.01);
(Continued)

(58) Field of Classification Search
CPC .............. B32B 17/10; B32B 17/10889; B32B 17/10018; B32B 17/10036; B32B 17/064;
(Continued)

(56) References Cited

U.S. PATENT DOCUMENTS 3,338,696 A    8/1967  Dockerty
3,682,609 A    8/1972  Dockerty
(Continued)

FOREIGN PATENT DOCUMENTS

DE    102009021938 A1    11/2010
EP        1031409 A1     8/2000
(Continued)

OTHER PUBLICATIONS

English Translation of JP2015559029 Office Action dated Nov. 14, 2017, Japan Patent Office, 3 Pages.
(Continued)

*Primary Examiner* — Catherine A. Simone

(57) ABSTRACT

A method of forming a flexible glass-polymer laminate structure includes heating a polymer layer to an elevated temperature of greater than 20° C. and below a working temperature of a flexible glass substrate adjacent the polymer layer. The flexible glass substrate has a thickness of no more than about 0.3 mm. The flexible glass substrate is shaped with the polymer layer at the elevated temperature. The polymer layer is cooled below the elevated temperature such that the flexible glass-polymer laminate structure maintains a non-planar formation.

15 Claims, 4 Drawing Sheets

Related U.S. Application Data

(60) Provisional application No. 61/769,379, filed on Feb. 26, 2013.

(51) Int. Cl.
  B32B 1/00 (2006.01)
  B29C 53/00 (2006.01)
  B32B 37/14 (2006.01)
  B32B 37/18 (2006.01)
  B32B 38/00 (2006.01)

(52) U.S. Cl.
  CPC .......... B32B 37/144 (2013.01); B32B 37/182 (2013.01); B32B 38/0012 (2013.01); *B32B 2307/546* (2013.01); *B32B 2315/08* (2013.01); *B32B 2457/00* (2013.01); *B32B 2457/20* (2013.01)

(58) Field of Classification Search
  CPC ....... B32B 1/00; B32B 37/144; B32B 37/182; B32B 38/0012; B32B 2307/546; B32B 2315/08; B32B 2457/00; B32B 2457/20; B29C 53/005
  See application file for complete search history.

(56) References Cited

U.S. PATENT DOCUMENTS

| | | | |
|---|---|---|---|
| 3,799,817 A * | 3/1974 | Laethem | B32B 27/306 216/34 |
| 4,238,265 A | 12/1980 | Deminet | |
| 4,969,966 A | 11/1990 | Norman | |
| 5,108,480 A * | 4/1992 | Sugiyama | C03B 23/0305 65/106 |
| 6,265,054 B1 | 7/2001 | Bravet et al. | |
| 6,270,605 B1 | 8/2001 | Doerfler | |
| 6,287,674 B1 * | 9/2001 | Verlinden | B32B 17/10018 428/210 |
| 2009/0201443 A1 | 8/2009 | Sasaki et al. | |
| 2012/0128952 A1 | 5/2012 | Miwa et al. | |
| 2012/0280368 A1 | 11/2012 | Garner | |
| 2012/0320509 A1 * | 12/2012 | Kim | G02F 1/1333 361/679.01 |
| 2013/0330495 A1 | 12/2013 | Maatta et al. | |

FOREIGN PATENT DOCUMENTS

| | | |
|---|---|---|
| EP | 2236281 A1 | 6/2010 |
| FR | 2750075 A1 | 12/1997 |
| GB | 1319846 A | 6/1973 |
| JP | 06340029 A | 12/1994 |
| JP | 11-001349 A | 1/1999 |
| JP | 2010145731 A | 7/2010 |
| JP | 6340029 B2 | 6/2018 |
| WO | 2011155403 A1 | 12/2011 |
| WO | 2012166343 A2 | 6/2012 |

OTHER PUBLICATIONS

English Translation of CN201480010414.0 Notice of First Office Action dated Aug. 3, 2016, 7 Pages; Chinese Patent Office.
Patent Cooperation Treaty; International Search Report; dated May 27, 2014; pp. 1-12.
TW103106343 Search Report dated Jul. 28, 2017; 1 Page; Taiwan Patent Office.
Korean Patent Application No. 10-2020-7020784, Notice of Allowance dated Feb. 19, 2021, 4 pages (2 pages of English Translation and 2 pags of Original Document); Korean Patent Office.

* cited by examiner

METHODS OF FORMING SHAPE-RETAINING FLEXIBLE GLASS-POLYMER LAMINATES

This application is a continuation and claims the benefit of priority under 35 U.S.C. § 120 of U.S. application Ser. No. 14/769,964, which is a national stage entry of PCT Application No. PCT/US14/017884 filed Feb. 24, 2014, which claims the benefit of priority under 35 U.S.C. § 119 of U.S. Provisional Application Ser. No. 61/769,379 filed on Feb. 26, 2013, the contents of which are relied upon and incorporated herein by reference in their entireties.

FIELD

The present invention relates to glass-polymer laminate structures and, more particularly, to shaped flexible glass-polymer laminates.

BACKGROUND

Flexible polymer substrates are manufactured using a polymer base material that is optionally laminated or coated with one or more polymer films or vacuum deposited coatings. These laminated substrate stacks are commonly used in flexible packaging associated with PV, OLED, LCDs and patterned Thin Film Transistor (TFT) electronics because of their low cost.

In order to promote flexible glass structures as an alternate technology selection, the real and perceived limitations of mechanical reliability performance associated with glass, a brittle material, must be overcome and demonstrated. Flexible glass substrates offer several technical advantages over flexible polymer technology. One technical advantage is the ability of the glass to serve as a moisture or gas barrier, a primary degradation mechanism in outdoor electronics. A second advantage is in its potential to reduce overall package size (thickness) and weight through the reduction or elimination of one or more package substrate layers. Another advantage is having excellent surface qualities associated with glass that can be cleaned easily. Thus, if the real and perceived limitations of mechanical reliability performance associated with glass can be overcome, the use of flexible glass structures can be advanced.

SUMMARY

One technique to improve the mechanical reliability of bare flexible glass is to laminate the flexible glass substrate with one or more thin film polymers. Depending on the mechanical strength requirements and the expected bending stresses and direction of the end application, according to the concepts disclosed herein, a flexible glass-polymer laminate substrate can be designed to meet various shape and mechanical requirements. In particular, flexible glass-polymer laminate structures can be formed having desired non-planar formations.

Additional features and advantages will be set forth in the detailed description which follows, and in part will be readily apparent to those skilled in the art from the description or recognized by practicing the invention as exemplified in the written description and the appended drawings. It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain, by way of example, principles and operation of the invention. It is to be understood that various features of the invention disclosed in this specification and in the drawings can be used in any and all combinations. By way of non-limiting example the various features of the invention may be combined with one another according to the following aspects.

According to a first aspect, there is provided a method of forming a flexible glass-polymer laminate structure, the method comprising:
  heating a polymer layer to an elevated temperature of greater than 20° C. and below a working temperature of a flexible glass substrate adjacent the polymer layer, the flexible glass substrate having a thickness of no more than about 0.3 mm;
  shaping the flexible glass substrate with the polymer layer at the elevated temperature; and
  cooling the polymer layer below the elevated temperature such that the flexible glass-polymer laminate structure maintains a non-planar formation.

According to a second aspect, there is provided the method of aspect 1, wherein the flexible glass substrate has one or more curve portions in the non-planar formation.

According to a third aspect, there is provided the method of aspect 1 or aspect 2, further comprising laminating the polymer layer to the flexible glass substrate.

According to a fourth aspect, there is provided the method of aspect 3, wherein the step of laminating is performed during the step of heating the polymer layer.

According to a fifth aspect, there is provided the method of aspect 3, wherein the step of laminating the polymer layer to the flexible glass substrate is performed before the step of heating the polymer layer.

According to a sixth aspect, there is provided the method of aspect 1 to 5, wherein a total glass thickness of the flexible glass-polymer laminate structure is no less than about ⅓ of a total laminate thickness.

According to a seventh aspect, there is provided the method of aspect 1 to 6, wherein the elevated temperature is less than about 200° C.

According to an eighth aspect, there is provided the method of aspect 1 to 7, wherein the step of shaping the flexible glass substrate includes applying a force to bend the flexible glass substrate.

According to a ninth aspect, there is provided the method of aspect 1 to 8, wherein the step of cooling the polymer layer includes cooling the polymer layer at a rate of no more than about 10° C. per minute.

According to a tenth aspect, there is provided the method of aspect 1 to 9, wherein the flexible glass substrate has a thickness of no greater than about 75 μm.

According to an eleventh aspect, there is provided a method of forming a flexible glass-polymer laminate structure comprising:
  shaping a flexible glass substrate with the polymer layer applied thereto, the flexible glass substrate having a thickness of no more than about 0.3 mm; and
  hardening the polymer layer such that the flexible glass-polymer laminate structure maintains a non-planar formation.

According to a twelfth aspect, there is provided the method of aspect 11, further comprising heating the polymer layer to an elevated temperature of greater than 20° C. and below a working temperature of the flexible glass substrate.

According to a thirteenth aspect, there is provided the method of aspect 12, wherein the elevated temperature is less than about 200° C.

According to a fourteenth aspect, there is provided the method of aspect 11 to 13, wherein the step of hardening the polymer layer includes applying ultraviolet radiation to the polymer layer.

According to a fifteenth aspect, there is provided the method of aspect 11 to 14, wherein the flexible glass substrate has one or more curve portions in the non-planar formation.

According to a sixteenth aspect, there is provided the method of aspect 11 to 15, further comprising laminating the polymer layer to the flexible glass substrate.

According to a seventeenth aspect, there is provided the method of aspect 11 to 16, wherein a total glass thickness of the flexible glass-polymer laminate structure is no less than about ⅓ of a total laminate thickness.

According to an eighteenth aspect, there is provided the method of aspect 11 to 17, wherein the step of shaping the flexible glass substrate includes applying a force to bend the flexible glass substrate.

According to a nineteenth aspect, there is provided the method of aspect 11 to 18, wherein the step of hardening the polymer layer includes cooling the polymer layer at a rate of no more than about 10° C. per minute.

According to a twentieth aspect, there is provided the method of aspect 11 to 19, wherein the flexible glass substrate has a thickness of no greater than about 75 μm.

DETAILED DESCRIPTION

Figure 1:
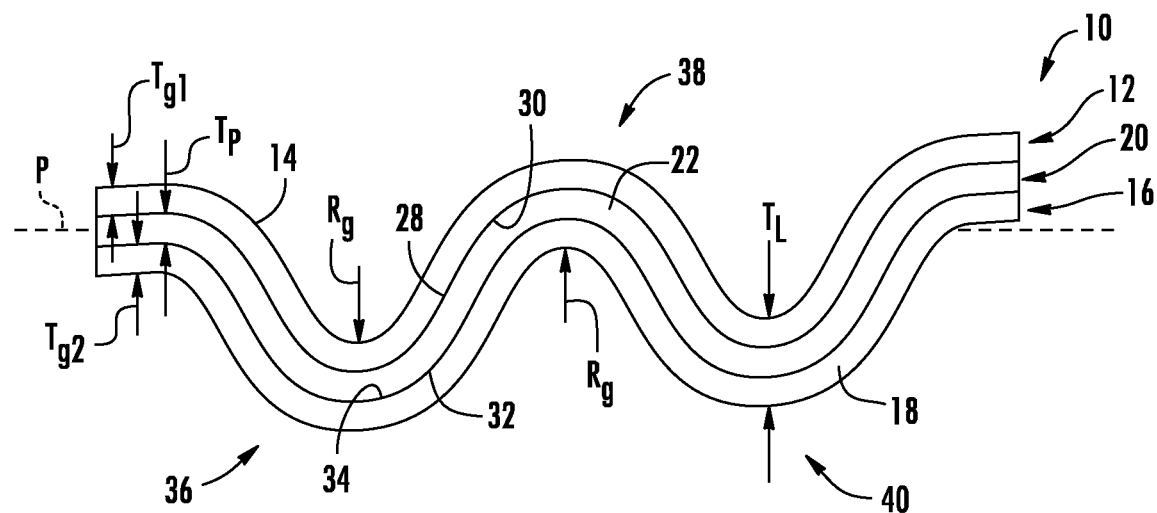
FIG. 1 is a schematic illustration of an embodiment of a flexible glass-polymer laminate structure having a non-planar formation.

In the following detailed description, for purposes of explanation and not limitation, example embodiments disclosing specific details are set forth to provide a thorough understanding of various principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of various principles of the present invention. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Flexible glass substrates can allow for curved or conformable shapes to be used in electronics, packaging and architectural applications, as examples. Due to the resilience of the flexible glass substrates, an external force (external to the flexible glass substrate itself) may be used to bend and/or hold the shape of the flexible glass substrate in a predetermined non-planar formation. As described herein, flexible glass-polymer laminate structures are formed having non-planar formations using a flexible glass substrate and a polymer substrate. The flexible glass-polymer laminates can hold their non-planar formations as a free-standing object (i.e., without any force external to the glass-polymer laminates to hold the flexible glass-polymer laminates in their non-planar formations).

Figure 2:
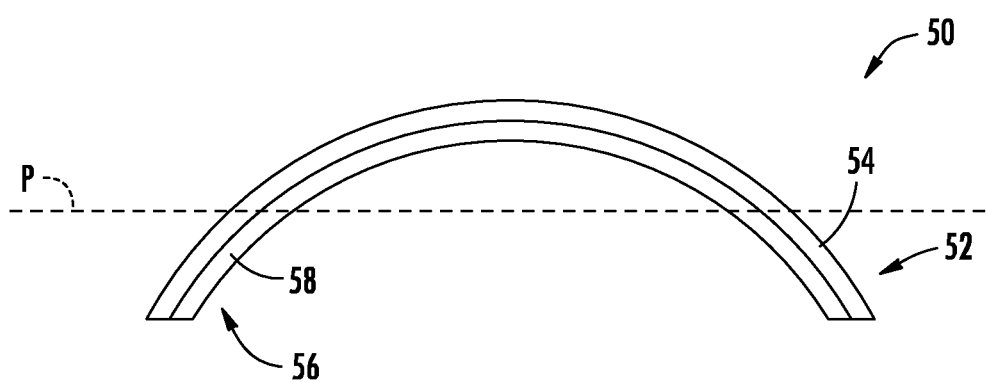
FIG. 2 is a schematic illustration of another embodiment of a flexible glass-polymer laminate structure having a non-planar formation.

Referring to FIGS. 1 and 2, two exemplary flexible glass-polymer laminate structures 10 and 50 are illustrated. Referring first to FIG. 1, the flexible glass-polymer laminate structure 10 includes a first outermost glass layer 12 that is formed by a first flexible glass substrate 14, a second outermost glass layer 16 that is formed by a second flexible glass substrate 18 and a polymer layer 20 formed of a polymer material 22 that is sandwiched between and laminated to the first and second flexible glass substrates 14 and 18. Adhesive layers may or may not be used to laminate the polymer material 22 to the first and second flexible glass substrates 14 and 18. As one example, the polymer material 22 may be selected to bond directly to the first and second flexible glass substrates 14 and 18 at interfaces between their respective broad surfaces 28, 30 and 32, 34.

The flexible glass-polymer laminate structure 10 has a non-planar formation. As used herein, the term "non-planar formation" refers to a 3-D shape where at least a portion of the flexible-glass polymer laminate structure extends outwardly or at an angle to a plane P defined by the original, laid out configuration of the flexible glass-polymer laminate structure 10. In the exemplary embodiment of FIG. 1, the flexible glass-polymer laminate structure 10 has one or more elevations or curve portions 36, 38 and 40 that extend outwardly from opposite sides of the plane P, forming a somewhat undulating non-planar formation. The flexible glass-polymer laminate 10 can hold the non-planar formation as a free-standing object, without any external force, the details of which will be described in greater detail below. Although the flexible glass-polymer laminate structure 10 is shown as including three layers, any suitable number of layers of each of the flexible glass substrates and polymer layers may be present.

While FIG. 1 illustrates outermost glass layers 12 and 16 and an undulating non-planar formation, other configurations are possible. FIG. 2, for example, illustrates the flexible glass-polymer laminate structure 50 including an outermost glass layer 52 formed by a flexible glass substrate 54 and an outermost polymer layer 56 formed by a polymer material 58. The flexible glass-polymer laminate 50 is in the form of a relatively smooth, arcuate non-planar formation that extends out of the plane P. Although the laminate structure 50 is shown with outer surface of the glass layer 52 being in a convex shape, and the outer surface of the polymer layer 56 being shown in a concave shape, the reverse may be true. Additionally, although the laminate structure 50 is shown as having two layers, any suitable number of layers of each the flexible glass substrate and polymer material may be present.

The flexible glass substrates described herein may have a thickness of about 0.3 mm or less including but not limited to thicknesses of, for example, about 0.01-0.05 mm, about 0.05-0.1 mm, about 0.1-0.15 mm, about 0.15-0.3 mm, including 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm, for example. Use of thin, flexible glass substrates allows for use of thin polymer layers in forming the desired non-planar formations. For example, in some embodiments, referring to FIG. 1, a total glass thickness $Tg_{tot}$ (i.e., the sum of $Tg_1$ and $Tg_2$, the thicknesses of the flexible glass substrates 14 and 16, respectively) is no less than about ⅓ of a total laminate thickness $T_L$ (i.e., $Tg_1$, $Tg_2$ and Tp, wherein Tp is the thickness of the polymer layer 20). The flexible glass substrates may be formed of glass, a glass ceramic, a ceramic material or composites thereof; for the sake of convenience in reference only, the terms "flexible glass substrate" or "glass layer" may be used throughout the specification, wherein such a substrate or layer may instead be made from any of these other materials. A fusion process (e.g., down draw process) that forms high quality flexible glass substrates can be used to form the flexible glass substrates. Flexible glass substrates produced in a fusion process may have surfaces with superior flatness and smoothness when compared to glass sheets produced by other methods. The fusion process is described in U.S. Pat. Nos. 3,338,696 and 3,682,609. Other suitable flexible glass substrate forming methods include a float process, updraw and slot draw methods.

A process is developed for forming a flexible glass-polymer laminate structure that utilizes the flexibility of the flexible glass substrate and the polymer material to form free-standing non-planar formations at temperatures below a working temperature of the particular flexible glass substrate used. The "working temperature" is the temperature to which the flexible glass substrate or the polymer material is to be heated to soften it to a viscosity where the material can be shaped and retain the shape upon cooling. For the flexible glass substrate, the working temperature depends on the composition of flexible glass used, but can be greater than about 1000° F., such as greater than about 1500° F., such as greater than about 2000° F. The polymer material may have a working temperature that is much less than the working temperature of the flexible glass substrate. In some instances, the working temperature of the polymer material may be about 50 percent or less of the working temperature of the flexible glass substrate, such as about 40 percent or less, such as about 30 percent or less, such as about 25 percent or less, such as about 15 percent or less, such as 10 percent or less. Because the polymer material can be shaped at lower temperatures than the working temperature of the flexible glass substrate, the polymer material may be used to hold the flexible glass substrate in the desired free-standing, non-planar formation.

Figure 3:
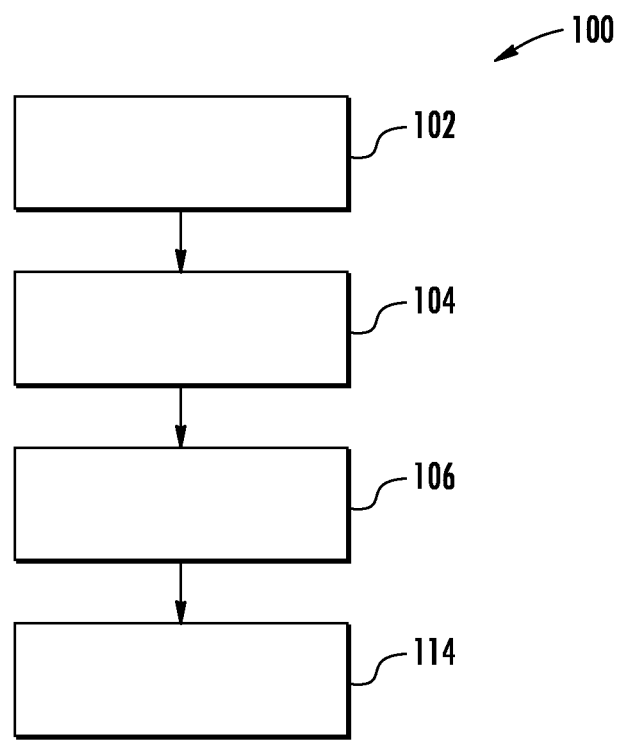
FIG. 3 illustrates an embodiment of a method of forming a flexible glass-polymer laminate structure.

Methods of manufacturing a laminated structure will now be described. FIG. 3 represents steps of example methods with the understanding that the illustrated steps may be carried out in a different order unless otherwise noted. Moreover, additional steps may be provided that are not illustrated unless otherwise stated. As shown in FIG. 3, the method can optionally begin at 100 with a step 102 of providing the flexible glass substrate having a thickness of less than about 300 μm or less, such as about 50 μm or less. The flexible glass substrate can be provided with glass selected from various families of glass including soda lime glass, borosilicate and alkaline earth boro-aluminosilicate although other glass compositions may be used in further examples.

At step 104, a polymer material may be applied to a broad surface of the flexible substrate. The polymer material may be applied on one side of the flexible glass substrate to form only one polymer layer (FIG. 2) or to multiple sides forming multiple polymer layers. Another flexible glass substrate may be applied to the polymer layer thereby sandwiching the polymer layer between glass layers (see FIG. 1). Additional flexible glass substrate and polymer substrate layers may be added. Intermediate adhesive layers or other layer types may be applied between polymer and glass layers. In many embodiments, the flexible glass substrate may be bonded directly to the polymer material without any use of an intermediate adhesive layer.

Figure 4:
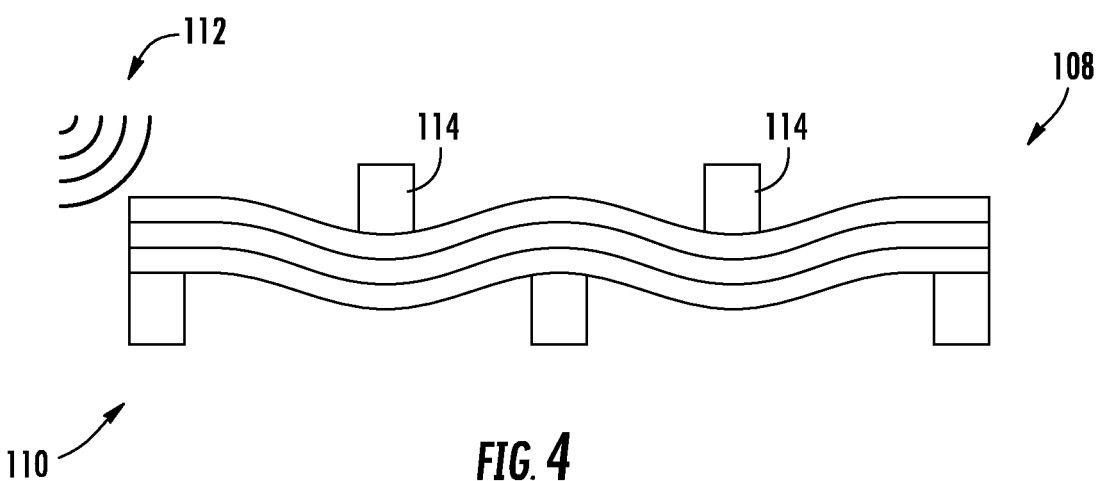
FIG. 4 is a schematic illustration of an embodiment of a forming apparatus for providing a flexible glass-polymer laminate structure having a non-planar formation.

Referring also to FIG. 4, at step 106 a preform flexible glass-polymer structure 108 may be shaped using a combination of a forming apparatus 110 and applied energy 112. The preform flexible glass-polymer structure 108 may initially be flat, thereby defining the plane P (FIG. 1). In other embodiments, the preform glass-polymer structure 108 may be formed into some other shape. Weights 114 or some other external source (e.g., a press, forming apparatus, etc.) are used for applying a force to the preform flexible glass-polymer structure 108. The applied energy 112 may be any suitable energy such as heat, radiation (e.g., ultraviolet), etc. While the energy 112 is applied, the preform flexible glass-polymer structure is shaped into a desired non-planar formation. After shaping, the energy is removed, the polymer material cools (e.g., at a rate of no more than about 10° C. per minute, such as at a rate of no more than about 5° C. per minute) and the preform flexible glass-polymer structure 108 retains the non-planar formation due to the strength and stiffness of the polymer layer. Cooling rates of higher than about 10° C. per minute may be used.

Referring to FIG. 1, for example, the curve portions 36, 38, 40, if provided, can have various curvatures generally defined by a radius of curvature Rg of the respective flexible glass substrate 14 or 18. In some examples, the radius of curvature for each of the respective flexible glass substrates 14 and 18 may be maintained above a minimum value to reduce stress in the flexible glass substrate during the step of shaping. For example, if the flexible glass substrate 14, 18 is capable of a 5 mm bend radius without breaking, then the preform flexible glass-polymer structure 108 can be shaped such that the flexible glass substrates 14 and 18 each have a bend radius of no less than about 5 mm in forming the final non-planar formation.

The minimum radius of curvature Rg of the flexible glass substrate may be selected to meet a predetermined equality. For example, the minimum radius of curvature may be selected to meet the following equality:

$$\frac{E \cdot t}{2Rg} \le \sigma_{max} \quad (1)$$

wherein "E" is the Young's Modulus of the glass, "t" is the thickness of the glass and $\sigma_{max}$ is the desired maximum stress in the flexible glass substrate.

By appropriately selecting the parameters of the glass and bend radius for the equality (1) above, the flexible glass substrate 14, 18 may be bent to form a wide range of curvatures. For instance, assuming a $\sigma_{max}$ of 15 MPa, a Young's Modulus of 70 GPa and a thickness of 50 μm for the flexible glass substrate 14, 18 the minimum curvature radius can be calculated as 116.7 mm. Considering a factor of safety, if desired, the radius of curvature Rg of the flexible glass substrate 14, 18 can be maintained above a minimum radius of curvature of 20 cm for the flexible glass substrate 14, 18 having a thickness of 50 μm. However, these values may vary depending on the type of flexible glass substrate used, the thickness, etc. Although similar radii of curvature are shown for portions 36, 38, 40, such need not be the case, i.e., they may have radii of curvature different from one another.

Once complete, as indicated by step 114, the step 106 of shaping can provide a flexible glass-polymer laminate wherein the shape of the preform flexible glass-laminate structure (e.g., flat) can be bent such that the flexible glass substrate is held in its non-planar formation by the polymer material. As such, the polymer material, once solidified, holds the flexible glass substrate in the non-planar formation. Prior to solidifying the polymer material, however, a forming apparatus, weights, clips or some other holding structure may be used to maintain a non-planar formation for the flexible glass sheet until the polymer material solidifies during the cooling process.

Figure 5:
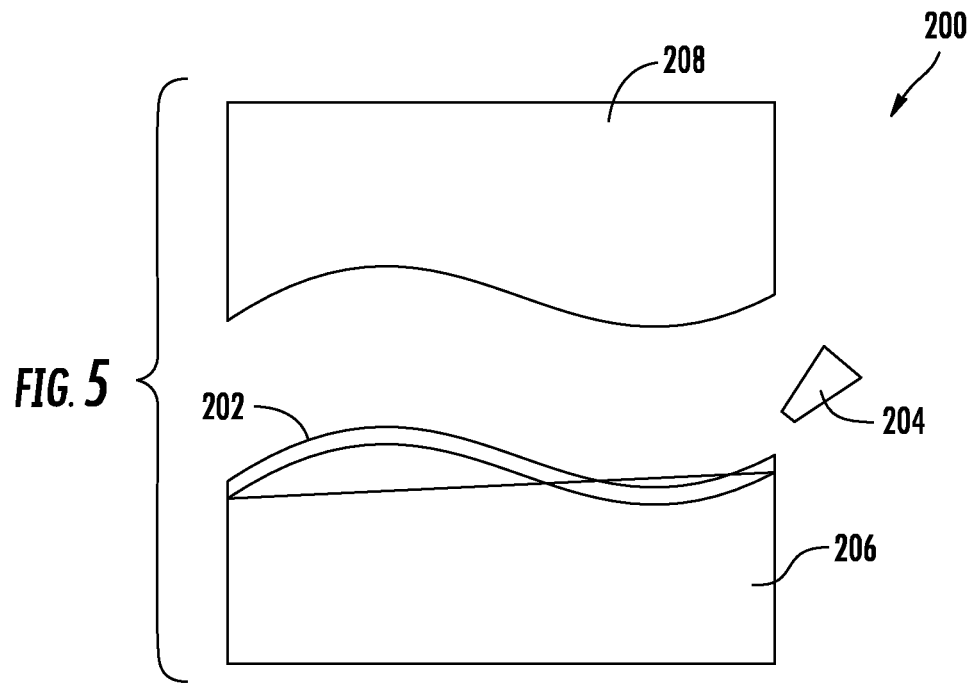
FIG. 5 is a schematic illustration of another embodiment of a forming apparatus for providing a flexible glass-polymer laminate structure having a non-planar formation in an open configuration.
Figure 6:
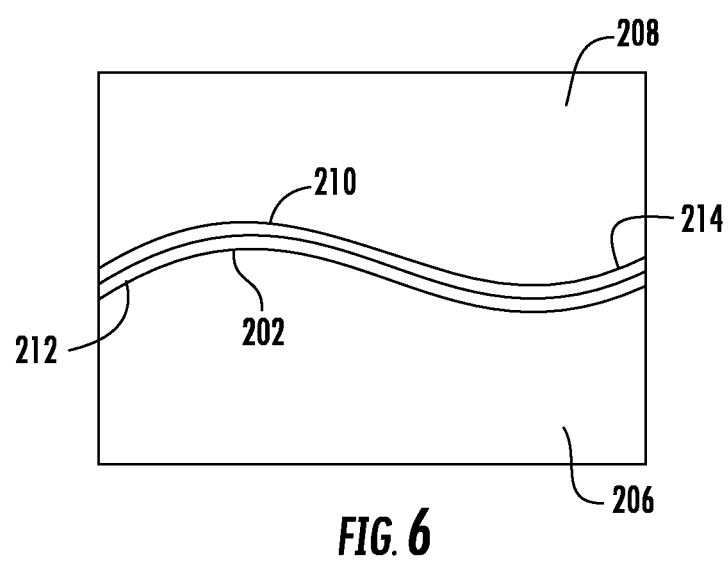
FIG. 6 is another illustration of the forming apparatus of FIG. 5 in a closed configuration.

In some embodiments, the steps of laminating the polymer material to the flexible glass substrate and shaping the flexible glass-polymer laminate may occur, at least to some extent, simultaneously. For example, referring to FIG. 5, a forming apparatus 200, such as a mold or some other pressure-applying device (e.g., a press) may be provided where a heated, softened polymer material 202 is applied to the forming apparatus 200, for example, using an extruder 204. The heated polymer material 202 may be applied to a single portion 206 of the forming apparatus 200 (e.g., to provide a single polymer layer) or to multiple portions 206 and 208 of the forming apparatus 200 (e.g., to provide multiple polymer layers). Still further, the heated polymer material 202 may be applied in any suitable pattern to the portion 206. Referring to FIG. 6, the portions 206 and 208 of the forming apparatus 200 may be brought together with a flexible glass substrate 210 located therebetween. As can be seen, the portions 206 and 208 of the forming apparatus 200 may have shaping surfaces 212 and 214 that force the flexible glass substrate 210 into the desired non-planar shape, and hold the flexible glass substrate 210 in the non-planar shape as the polymer material 202 cools and solidifies. A flexible glass-polymer laminate structure having a non-planar formation may then be removed from the forming apparatus 200 and maintain its non-planar shape. Another example of this type of process could be use of a polymer injection molder with a flexible glass insert. The flexible glass may be held in a non-planar shape as polymer is injected into the mold. Upon removal from the mold and cooling, the flexible glass and polymer structure can hold the non-planar shape.

EXAMPLE

Two 75 μm thick flexible glass substrates were laminated together using a polymer material (a pressure sensitive adhesive) providing a preform flexible glass-polymer structure. The preform flexible glass-polymer structure was placed into a room temperature oven with the support and weight (25 g each) arrangement shown by FIG. 4. The oven was heated at a rate of 5° C. per minute up to a temperature of 200° C. (well below the working temperature of the flexible glass substrates). The temperature was held at 200° C. for one hour before cooling at a rate of 5° C. per minute. Upon removing the flexible glass-polymer laminate from the weights and supports, the flexible glass-polymer laminate held its non-planar formation.

Figure 7:
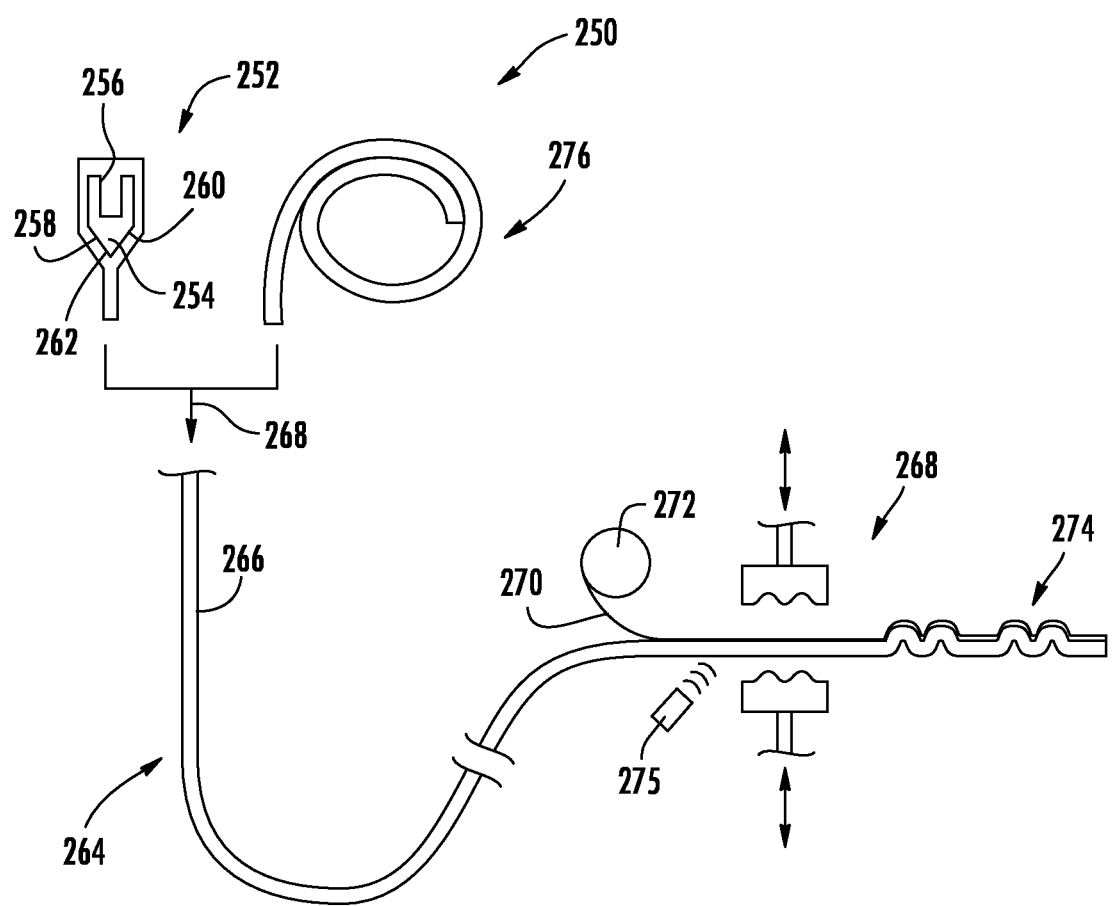
FIG. 7 is a schematic illustration of another embodiment of a method of forming a flexible glass-polymer laminate structure having a non-planar formation.

While the flexible glass substrates described above are illustrated as flexible glass sheets, continuous flexible glass substrates may be used to form the flexible glass polymer laminate structures having non-planar formations during a continuous process, such as a roll or fabrication (e.g., down draw) process. FIG. 7, for example, illustrates two example sources 250 of flexible glass substrate, although other sources may be provided. For instance, the source 250 can include a down draw glass forming apparatus 252. As schematically shown, the down draw glass forming apparatus 252 can include a forming wedge 254 at a bottom of a trough 256, wherein glass flows down opposite sides 258 and 260 of the forming wedge 254. The two sheet of molten glass are subsequently fused together as they are drawn off root 262 of the forming wedge 254. As such, the flexible glass substrate 266, in the form of a flexible glass ribbon, may be fusion drawn to traverse in a downward direction 268, off the root 254 of the forming wedge 254 and directly into a downward zone 264 positioned downstream of the down draw glass forming apparatus.

After forming, the flexible glass substrate 266 may be further processed, such as by cutting, trimming, etc. The flexible glass substrate 266, in the form of the continuous flexible glass ribbon, may be delivered or directed to a forming apparatus 268. The forming apparatus 268 may be similar to the forming apparatus 200 of FIG. 5 and used to impart a non-planar formation to the flexible glass substrate 266. In the illustrated embodiment, a polymer material 270 may be a continuous film that is supplied from a roll 272 to the flexible glass substrate 266. The polymer material 270 may also be in the form of a curable material or coating. Portions of the forming apparatus 268 may be brought together, the polymer material heated as discussed above using heater 275 and then cooled (e.g., using water cooling or other cooling methods) to impart a non-planar formation to the resulting flexible glass-polymer laminate structure 274. Other forming apparatus may be used such as opposing rollers that can be used to impart non-planar shapes to the flexible glass-polymer laminate structures.

Another example source 250 of the flexible glass substrate 266 can include a coiled spool 276 of the flexible glass substrate 266. For example, the flexible glass substrate 266 may be wound into the coiled spool 276 after being drawn into a flexible glass ribbon, for example using the down draw glass forming apparatus 252. Thus, if the source 250 includes the coiled spool 276, the flexible glass substrate 266 may be uncoiled from the coiled spool 276 to traverse in the downward direction 268 into the downward zone 264. Other arrangements are possible, such as uncoiling the flexible glass substrate in a horizontal direction.

The polymer layers for use in the laminate structures described herein may include various polymers, for example, any one or more of polyethylene teraphthalate (PET), polyethylene Naphthalate (PEN), ethylene tetrafluoroethylene (ETFE), or thermopolymer polyolefin (TPO™— polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate and polysiloxanes. It is also possible to use polymers which can be deposited/coated as pre-polymers or pre-compounds and then converted, such as epoxy-resins, polyurethanes, phenol-formaldehyde resins, and melamine-formaldehyde resins. Many display and electrical applications may prefer acrylic based polymers, silicones and such structural aiding layers, for example, commercially available SentryGlas® from DuPont. The polymer layers may be transparent for some applications, but need not be for other applications.

Additionally, each of the polymer layers may itself be a laminated or composite structure made of different types of polymer having different Young's moduli, different Poisson's Ratios, and/or layer thicknesses. The polymer materials can also be filled composite systems that include both organic and inorganic components distributed through its bulk layer. In this case, the compound layer can be homogenized to find effective values for the overall layer, including an effective thickness, an effective Young's modulus, and an effective Poisson's Ratio that may be used as described herein to beneficially configure a glass-polymer laminate. The composites, for example, may be formed of any combinations of the above materials and/or metals, such as stainless steel, nickel, copper, noble metals, metal oxides, etc.

The glass-polymer laminates described herein may be used as a substrate for mounting device-functional layers, or may be used as an encapsulant layer or barrier layer within a device. The device may be an electronic device, for example, a display screen (including a Liquid Crystal Display, a Plasma Display, an Organic Light Emitting Diode display, flat panel display, for example), a lighting-emitting device, or a solar cell module. The functional layers may include, for example, thin film transistors (TFTs), diodes, photodiodes, triodes, photovoltaic cells, photocouplers, transparent electrodes, color filter, or an electroconductive layer. The glass-polymer laminate may be used as a cover laminated onto the display screens. The glass-polymer laminate may be used as a substrate/encapsulant not only for OLEDs (small molecule fluorescence (SMF) and (LEP) light emitting polymers) but for other devices including an electrically active layer e.g. organic photo-detectors, organic solar-cells, thin-film-transistor (TFT) arrays and TFTs for OLEDs. Another use is for LEP products such as un-patterned backlights and other light sources or patterned devices such as signs, alpha-numeric displays or dot-matrix and other high-resolution displays. Additionally, devices can be fully or partially fabricated on the separate flexible glass or polymer layers before final assembly of the laminated structure. In this case, the devices may exist between the polymer and flexible glass layers.

The glass-polymer laminate may be a substantially transparent structure for use as a protective element in an electronic device, wherein the glass-polymer laminate is a composite structure comprising a layer of glass of a thickness from 5 to 300 microns, and a layer of polymer ranging in thickness from 50 microns to 1 cm or more. In this connection, the formability of the glass-polymer laminate allows it to deviate from full planarity by bending and/or twisting and then locking into shape.

The glass and polymer layers can be provided in sheet form according to a batch process. Alternatively, the glass layer can be provided in sheet form and the polymer layer from a continuous roll. As a further possibility, both glass and polymer layers are from continuous rolls. The composite structure can be formed by lamination of the glass and polymer layers, e.g. according to a batch process, a continuous roll-to-roll process or a semi-continuous process whereby the polymer layer is a continuous film and the glass layer is in sheet form. The glass and/or polymer layers may be of constant thickness, or may be of varying thicknesses.

For the polymer layer, it is possible to use polymers which can be deposited/coated as pre-polymers or pre-compounds and then converted, such as epoxy-resins, polyurethanes, phenol-formaldehyde resins, UV-curable acrylates and melamine-formaldehyde resins. The lamination of the glass and polymer layers can be with glue/adhesive in between the layers. In that case, adhesive can be pre-coated onto one of the two or on both substrates; or supplied during the lamination process, at room or elevated temperature and with or without pressure. UV-cured glues are also suitable. The polymer layer can be in the form of polymer sheets which are pre-coated with a heat-seal glue. Lamination and/or deposition of the polymer layer onto the glass layer can be integrated in the fabrication process of the glass, i.e. glass comes off the fabrication line and is then (still hot or warm or cold) coated with the polymer.

As an alternative to formation by lamination, the polymer layer of the composite may be coated onto the glass layer by a batch or continuous process. Coating of the polymer onto the glass can be by dip, spray, solution-spin, solution-blade, meniscus coating, slot die coating or by coating of a molten polymer onto the glass layer. That is, it is possible to consider the different situations (i) where polymer exists already as film and is laminated to the glass and (ii) where polymer is not in film form but is coated onto the glass by dip, spray, etc. etc. Pre-polymers are amenable to case (ii). However, several of the other polymers mentioned above can be coated for case (ii). In this instance the polymers can be coated onto the glass principally by: coating from solution, from a melt or as pre-polymer.

In manufacture of an electronic device, it is usually necessary to subject some or all of the layers to processing steps. For example, if there is present an electroluminescent organic material that is a semiconductive conjugated polymer such as poly(phenylene vinylene) (PPV) then the deposition of that layer would normally take place by depositing a precursor to the polymer in a solvent, for example by spin-coating, and then subjecting that layer to a subsequent processing step to convert the precursor to the final polymer. Thus, the underlying glass-polymer laminate, if present during these processing steps, must be able to withstand the solvents used for spin-coating the precursor layer and the subsequent temperatures used for driving off the solvent and converting the precursor to the polymer. Thus, the polymer layer of the glass-polymer laminate needs to be of appropriate qualities. For example, if the glass-polymer laminate is to be subjected to high temperatures, then the glass-transition temperature of the polymer layer (and the working temperature of any adhesive used) should be above those temperatures. For example, a temperature of in excess of 150° C. is possible. Moreover, in certain situations, the polymer layer should be resistant to the solvent layers used for the polymers, such as mixed xylene, THF, used for soluble conjugated polymers such as MEH PPV.

The above-described flexible glass-polymer laminate structures utilize ultra-thin flexible glass substrates that enable use of thinner polymer layers or lower modulus polymer layers in locking the flexible glass substrate in a non-planar formation. Thickness of the polymer layer(s) may be three times or less in thickness (e.g., two times or less, about the same thickness, etc.) compared to thickness of the glass layer(s). The ultra-thin flexible glass substrates can have a much lower stress upon bending compared to thicker glass substrates. This lower bend stress can allow for a much smaller bend radius compared to thicker glass substrates.

In addition to electronic devices, the above-described flexible glass-polymer laminate structures may be used in other areas, such as architectural surface decoration, protective coatings, electrochromatic windows, fire resistant surfaces and in various configurations of multi-stack structures required to meet ballistic glazing requirements. Similarly, the flexible glass-polymer laminate structures could act as a barrier material to protect films, structures and/or devices from oxygen and moisture ingress/permeation for applications such as organic/thin film, PV, OLED display and lighting.

It should be emphasized that the above-described embodiments of the present invention, particularly any "preferred" embodiments, are merely possible examples of implementations, merely set forth for a clear understanding of various principles of the invention. Many variations and modifications may be made to the above-described embodiments of the invention without departing substantially from the spirit and various principles of the invention. All such modifications and variations are intended to be included herein within the scope of this disclosure and the present invention and protected by the following claims.

What is claimed is:

1. A flexible glass-polymer laminate structure comprising:
   a flexible glass substrate bent to a curved shape such that the flexible glass substrate comprises a curved portion; and
   a polymer layer laminated to the curved portion of the flexible glass substrate;
   wherein a total glass thickness of the flexible glass-polymer laminate structure is no less than ⅓ of a total laminate thickness;
   wherein a glass material of the flexible glass substrate has a working temperature and a polymer material of the polymer layer has a working temperature, wherein the working temperature of the polymer material is 25 percent or less of the working temperature of the glass material;
   wherein the polymer layer has a strength and a stiffness such that the polymer layer maintains the curved shape of the flexible glass substrate without application of any external force;
   wherein the working temperature of the glass material of the flexible glass substrate is greater than 1000 degrees F.; and
   wherein the curved portion of the flexible glass substrate defines a minimum radius of curvature Rg, wherein Rg is given by the equation:

$$\frac{E \cdot t}{2Rg} \leq \sigma_{max}$$

wherein E is the Young's Modulus of the glass material of the flexible glass substrate, t is a thickness of the flexible glass substrate and $\sigma_{max}$ is a maximum allowed stress in the flexible glass substrate.

2. The flexible glass-polymer laminate structure of claim 1, wherein an outer surface of the flexible glass substrate at the curved portion defines a convex curved surface.

3. The flexible glass-polymer laminate structure of claim 2, wherein the polymer layer is laminated to an inner surface of the flexible glass substrate along a concave curved surface of the flexible glass substrate, the concave curved surface located on an opposite side of the flexible glass substrate from the convex curved surface.

4. The flexible glass-polymer laminate structure of claim 1, wherein a thickness of the flexible glass substrate is no more than about 0.3 mm.

5. The flexible glass-polymer laminate structure of claim 1, wherein the glass material of the flexible glass substrate is one of a soda-lime glass material, a borosilicate glass material or an alkaline earth boro-aluminosilicate glass material.

6. The flexible glass-polymer laminate structure of claim 1, further comprising a second flexible glass substrate comprising a curved portion, wherein the polymer layer is laminated between the flexible glass substrate and the second flexible glass substrate.

7. The flexible glass-polymer laminate structure of claim 6, wherein the polymer layer bonds directly to an interior, broad surface of the flexible glass substrate and directly to an interior, broad surface of the second flexible glass substrate.

8. The flexible glass-polymer laminate structure of claim 1, wherein the flexible glass substrate comprises multiple curved portions.

9. A curved glass-polymer laminate structure comprising:
   a glass substrate, the glass substrate being flexible and comprising a curved portion; and
   a polymer layer interfacing a surface of the curved portion of the glass substrate;
   wherein a glass material of the glass substrate has a working temperature, wherein a polymer material of the polymer layer has a working temperature, wherein the working temperature of the polymer material is 50 percent or less of the working temperature of the glass material;

wherein the polymer layer maintains a curved shape of the curved portion of the glass substrate without application of any external force;

wherein the curved portion of the glass substrate defines a minimum radius of curvature Rg, wherein Rg is given by the equation:

$$\frac{E \cdot t}{2Rg} \leq \sigma_{max}$$

wherein E is the Young's Modulus of the glass material of the glass substrate, t is a thickness of the glass substrate and $\sigma_{max}$ is a maximum allowed stress in the glass substrate.

10. The curved glass-polymer laminate structure of claim 9, wherein an outer surface of the glass substrate at the curved portion defines a convex curved surface, wherein the polymer layer is laminated to an inner surface of the glass substrate along a concave curved surface of the glass substrate located within the curved portion.

11. The curved glass-polymer laminate structure of claim 9, wherein a thickness of the glass substrate is no more than about 0.3 mm.

12. The curved glass-polymer laminate structure of claim 9, wherein a total glass thickness of the curved glass-polymer laminate structure is no less than about ⅓ of a total laminate thickness.

13. The curved glass-polymer laminate structure of claim 9, wherein a thickness of the glass substrate is between 5 microns and 300 microns, wherein a thickness of the polymer layer is between 50 microns and 1 cm.

14. The curved glass-polymer laminate structure of claim 9, wherein the working temperature of the glass material of the glass substrate is greater than 1000 degrees F., wherein the glass material of the glass substrate is one of a soda-lime glass material, a borosilicate glass material or an alkaline earth boro-aluminosilicate glass material.

15. A curved glass-polymer laminate structure comprising:
a glass substrate, the glass substrate being flexible and comprising a curved portion, an inner surface and an outer surface, wherein the outer surface of the glass substrate located at the curved portion defines a convex curved surface and the inner surface of the glass substrate located at the curved portion defines a concave curved surface; and
a polymer layer interfacing the inner surface of the glass substrate;
wherein the polymer layer has a strength and a stiffness such that the polymer layer maintains a curved shape of the curved portion of the glass substrate without application of any external force;
wherein a glass material of the glass substrate has a working temperature, wherein a polymer material of the polymer layer has a working temperature, wherein the working temperature of the polymer material is 25 percent or less of the working temperature of the glass material;
wherein the concave curved surface of the glass substrate defines a minimum radius of curvature Rg, wherein Rg is given by the equation:

$$\frac{E \cdot t}{2Rg} \leq \sigma_{max}$$

wherein E is the Young's Modulus of the glass material of the glass substrate, t is a thickness of the glass substrate and $\sigma_{max}$ is a maximum allowed stress in the glass substrate.

* * * * *